May 26, 1931.  W. DWYER  1,806,845
INJECTOR AND ASPIRATOR
Filed Feb. 18, 1929   2 Sheets-Sheet 1
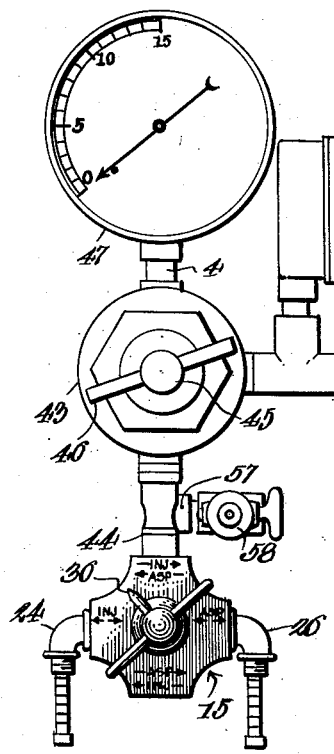
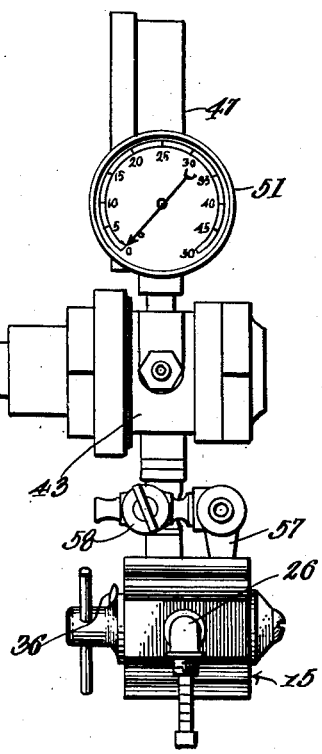
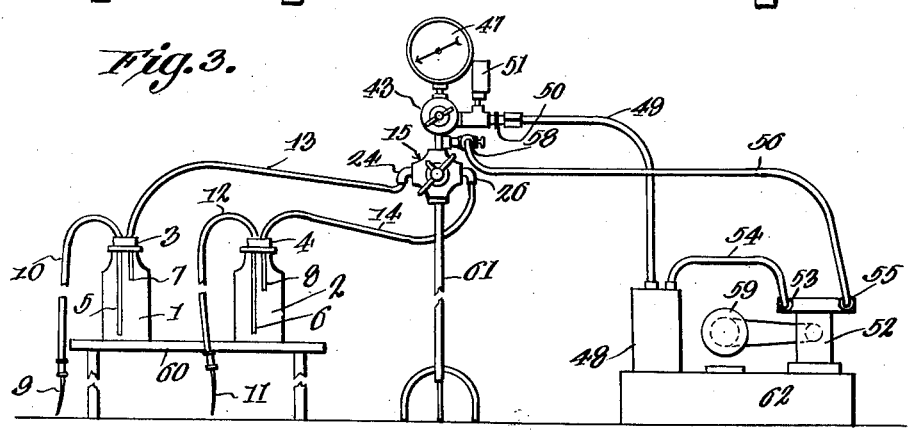
WITNESSES
INVENTOR.
WILL DWYER
BY
ATTORNEYS.

May 26, 1931. W. DWYER 1,806,845
INJECTOR AND ASPIRATOR
Filed Feb. 18, 1929 2 Sheets-Sheet 2

WITNESSES
INVENTOR.
WILL DWYER
BY
ATTORNEYS.

Patented May 26, 1931

1,806,845

UNITED STATES PATENT OFFICE

WILL DWYER, OF DALLAS, TEXAS

INJECTOR AND ASPIRATOR

Application filed February 18, 1929. Serial No. 340,904.

This invention relates to embalming apparatus, and has for one of its objects to provide an apparatus of this character which shall be adapted to permit the practicing in an expeditious and highly efficient manner, of the method of embalming the dead human body which, as now practiced, consists in injecting preservative and disinfecting solutions into the tissues of the body, in removing the blood from the body when necessary, in aspirating liquids and gases from the cavities of the body, and in injecting preservative and disinfecting solutions into the aspirated cavities.

To attain the foregoing and other objects, the invention comprehends the provision of an apparatus which shall be adapted to permit the operator to embalm one body or simultaneously embalm a number of bodies. The invention also comprehends the provision of an apparatus which shall be adapted to permit the operator to inject the preservative and disinfecting solutions into one or more arteries of the same body.

The invention also comprehends the provision of an apparatus which shall be adapted to permit the operator to inject the preservative and disinfecting solutions into the body and aspirate the fluids and gases from the body simultaneously.

The invention also comprehends the provision of an apparatus which shall embody a plurality of instruments and means adapted to permit one or the other of the instruments to be used for injecting the preservative and disinfecting solutions into the body and the other to be used for aspirating the fluids and gases from the body.

The invention also comprehends the provision of an apparatus wherein the said means shall be adapted to permit both of the instruments to be used for injecting the preservative and disinfecting solutions into the body or to be used for the purpose of aspirating the fluids and gases from the body.

The invention further comprehends the provision of an apparatus which shall embody means adapted to automatically regulate the pressure under which the preservative and disinfecting solutions are injected into the body.

The invention comprehends the construction, combination and arrangement of parts hereinafter fully described and claimed, and illustrated in the accompanying drawings, wherein:

Figure 1 is a view in front elevation of the instrument and pressure controlling means of my apparatus;

Figure 2 is a view in side elevation of the instrument and pressure controlling means;

Figure 3 is a view in elevation of the complete apparatus;

Figure 4:
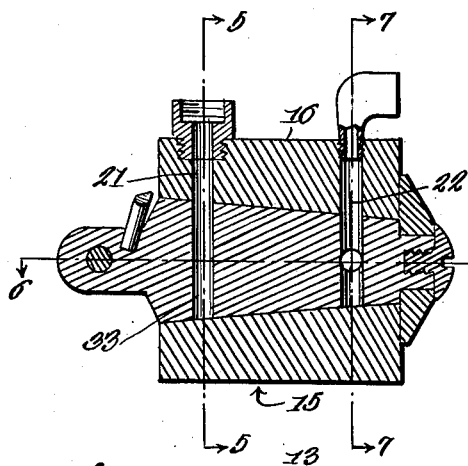
Figure 4 is a sectional view through the master valve of the apparatus.
Figure 5:
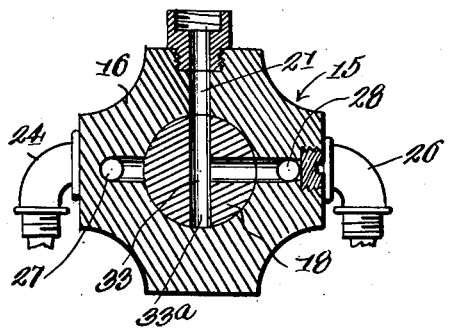
Figure 5 is a sectional view taken on the vertical plane indicated by the line 5—5 of Figure 4.
Figure 6:
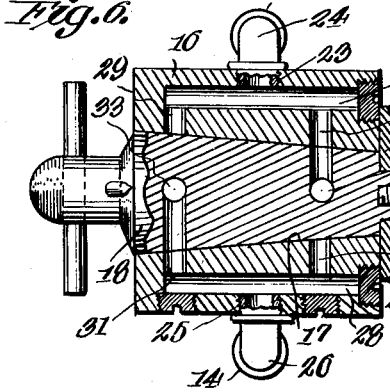
Figure 6 is a sectional view taken on the horizontal plane indicated by the line 6—6 of Figure 4.
Figure 7:
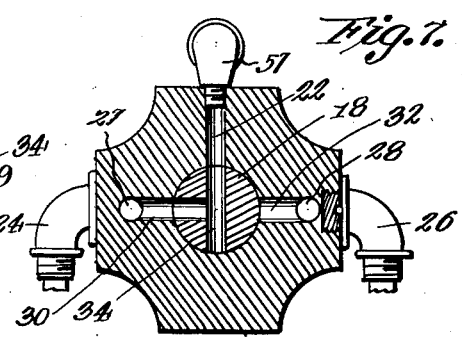
Figure 7 is a sectional view taken on the vertical plane indicated by the line 7—7 of Figure 4.
Figure 8:
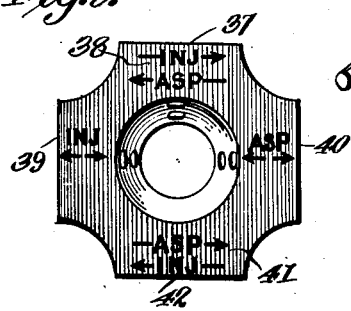
Figure 8 is a view in front elevation of the housing or casing of the valve shown in Figures 4 to 7.
Figure 9:
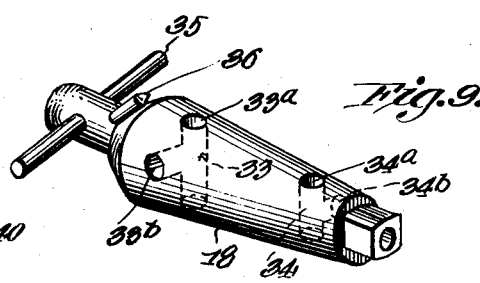
Figure 9 is a perspective view of the rotor or plug of the valve.

The apparatus comprises receptacles 1 and 2 which are adapted to receive the preservative and disinfecting solutions to be injected into the body or bodies, the receptacles being adapted to also receive the liquids aspirated from the body or bodies. The receptacles 1 and 2 are closed by stoppers 3 and 4, respectively, and are provided with long tubes 5 and 6 and short tubes 7 and 8, respectively, the tubes being supported by the stoppers with their lower ends in proper spaced relation to the bottoms of the receptacles. An instrument 9 is connected by a flexible tube 10 to the long tube 5 of the receptacle 1, and an instrument 11 is connected by a flexible tube 12 to the long tube 6 of the receptacle 2. A flexible tube 13 connected to the tube 7 of the receptacle 1, and a similar tube 14 connected to the tube 8 of the receptacle 2, are connected to a master valve 15.

This valve comprises a casing 16 having a conical bore or chamber 17, and a conical rotor or plug 18 mounted in the chamber and held therein by a machine screw 19 and a washer 20. The casing 16 is provided in its upper side with an inlet or pressure port 21 and an outlet or suction port 22. The casing 16 is provided in one lateral side thereof with a port 23 with which the tube 13 is connected through the medium of a coupling 24. The casing 16 is provided in its other lateral side with a port 25 with which the tube 14 is connected through the medium of a coupling 26. The ports 23 and 25 communicate respectively with passages 27 and 28 which extend longitudinally of the casing 16 between the chamber 17 and the lateral sides of the casing. The passage 27 communicates with the chamber 17 through the medium of ports 29 and 30, and the passage 28 communicates with the chamber through the medium of ports 31 and 32. The plug 18 is provided with T-shaped passages 33 and 34. The long branches 33ª and 34ª of the passages 33 and 34 extend in parallel relation diametrically through the plug 18, and the short branches 33ᵇ and 34ᵇ of these passages open out through diametrically opposite sides of the plug. During the operation of the plug 18, the passage 33 moves into and out of registration with the ports 21, 29 and 31, and the passage 34 moves into and out of registration with the passages 22, 30 and 32. The plug 18 is provided with a handle 35 and with an indicator or pointer 36 which cooperates with plug position indicating characters 37, 38, 39, 40, 41 and 42.

A standard diaphragm regulator 43, which is arranged above the master valve 15, is connected to the master valve by coupling 44 with its outlet in communication with the pressure port 21 of the master valve. The regulator 43 controls the pressure under which the preservative and disinfecting solutions are injected into the body or bodies, and it may be adjusted to vary the pressure through the medium of its diaphragm controlling screw 45 which is equipped with a handle 46. The regulator 43 has associated therewith a gage 47 which enables the operator to ascertain the pressure under which the preservative and disinfecting solutions are being injected into the body or bodies. The regulator 43 may be of any well known or appropriate construction, the one shown in the drawings being known to the trade as "Rego" and patented March 6th, 1917, and October 18th, 1921.

The inlet of the regulator 43 is connected to an air storage tank 48 by a flexible metal tube 49. A coupling 50 connects the tube 49 to the regulator 43, and carried by the coupling is a gage 51 which enables the operator to ascertain the air pressure in the tank 48.

A compressor 52 has its outlet 53 connected to the tank 48 by a flexible metal tube 54. The intake 55 of the compressor 52 is connected to the suction port 22 of the master valve 15 by a flexible metal tube 56. A coupling 57 connects the tube 56 to the master valve 15, and carried by the coupling is a pet cock 58. An electric motor 59 may be employed for operating the compressor 52.

If desired, the receptacle 1 and 2 may be arranged upon a table 60, the master valve 15 and the parts carried thereby may be mounted upon a stand 61, and the tank 48, compressor 52 and motor 59 may be mounted upon a base 62, or any other suitable means may be employed for supporting the various parts of the apparatus.

When the pet cock 58 is closed, and when the plug 18 is in position to register its passage 33 with the ports 21 and 31 and its passage 34 with the ports 22 and 32, communication is established between the tank 48 and the receptacle 2 and between the intake 53 of the compressor 52 and the receptacle 1. The pointer 36, after this adjustment of the plug 18, registers with the position indicating characters 37 and 38. The apparatus is now adjusted to permit the operator to inject with the instrument 11 and aspirate with the instrument 9. When the plug 18 is adjusted to register its passage 33 with the ports 21 and 29 and its passage 34 with the ports 22 and 30, communication is established between the tank 48 and the receptacle 1 and between the intake 53 of the compressor 52 and the receptacle 2. The pointer 36 now registers with the position indicating characters 41 and 42, and the apparatus is adjusted to permit the operator to aspirate with the instrument 11 and inject with the instrument 9. When the plug 18 is adjusted to register its passage 33 with the ports 29 and 31 and its passage 34 with the ports 22, 30 and 32, all communication between the tank 48 and the receptacles 1 and 2 is cut off, and communication is established between the receptacles and the intake 55 of the compressor 52. The pointer 36 now registers with the position indicating character 40, and the apparatus is adjusted to permit the operator to aspirate with both instruments 9 and 11. When the pet cock 58 is opened, and the plug 18 adjusted to register its passage 33 with the ports 21, 29 and 31, all communication between the receptacles 1 and 2 and the intake 55 of the compressor 52 is cut off, and communication is established between the receptacles and the tank 48. The pointer 36 now registers with the position indicating character 39, and the apparatus is adjusted to permit the operator to inject with both instruments 9 and 11. The instruments 9 and 11 may be used to embalm one body or two bodies. If it is desired to embalm a greater number of bodies at one time, the apparatus may be equipped with a number of the receptacles 1 and a number of the receptacles 2.

While I have described the principle of the invention, together with the structure which I now consider to be the best embodiment thereof, I wish it understood that the structure shown is merely illustrative and that such changes may be made when desired as are within the scope of the invention as claimed. It is to be further understood that the instruments connected to the tubes 10 and 11 may be arterial tubes or trocars or drainage tubes and that one tube may be equipped with one of these instruments and the other tube with another of the instruments, the type or types of the instruments used depending upon the nature of the work to be done.

What I claim is:

1. An apparatus of the character set forth, comprising a valve casing provided with a pressure port and a suction port, a plug rotatably mounted in the casing and provided with T-shaped passages, the long branches of the passages extending diametrically through the plug and the short passages thereof extending through diametrically opposite sides of the plug, the casing being provided with ports in alinement with the passages in the plug and being provided with passages communicating with said ports, a receptacle communicating with one of the casing passages, a receptacle communicating with the other casing passage, an instrument connected to each receptacle, pressure means connected to the pressure port of the casing, and suction means connected to the suction port of the casing.

2. An apparatus of the character set forth, comprising a valve casing provided with a pressure port and a suction port, a plug rotatably mounted in the casing and provided with T-shaped passages, the casing being provided with ports in alinement with the passages of the plug, and with passages communicating with said ports, a receptacle communicating with one of the casing passages, a receptacle communicating with the other casing passage, an instrument connected to each receptacle, a pressure regulator connected to the pressure port of the casing, a pressure tank connected to the regulator, a compressor having its outlet connected to the tank and its inlet connected to the suction port of the casing, and a pet cock positioned between said last port and the inlet of the compressor.

3. An apparatus of the character set forth, comprising a valve casing having a pressure port, a suction port and a chamber, the casing being provided with passages and with ports establishing communication between the chamber and passages, a plug rotatably mounted in the chamber and provided with multiple branch passages, a pressure regulator connected to the pressure port of the casing, a tank connected to the regulator, a compressor having its outlet connected to the tank and its inlet connected to the suction port of the casing, and a valve arranged in the connection between said suction port and inlet.

4. An apparatus of the character set forth, comprising a valve casing having a pressure port, a suction port and a chamber, the casing being provided with passages and with ports establishing communication between the chamber and passages, a plug rotatably mounted in the chamber and provided with multiple branch passages, a pressure regulator connected to the pressure port of the casing, a tank connected to the regulator, a compressor having its outlet connected to the tank and its inlet connected to the suction port of the casing, a valve arranged in the connection between said suction port and inlet, a pressure gage connected to the regulator, and a pressure gage arranged between the tank and pressure port of the casing.

In testimony whereof I affix my signature.

WILL DWYER.